US010585272B2

(12) United States Patent
Menon et al.

(10) Patent No.: US 10,585,272 B2
(45) Date of Patent: Mar. 10, 2020

(54) COHERENT FLUORESCENCE SUPER-RESOLUTION MICROSCOPY

(71) Applicants: UNIVERSITY OF UTAH RESEARCH FOUNDATION, Salt Lake City, UT (US); BAR-ILAN UNIVERSITY, Ramat Gan (IL)

(72) Inventors: Rajesh Menon, Salt Lake City, UT (US); Jordan Gerton, Salt Lake City, UT (US); Carl Ebeling, Salt Lake City, UT (US); Amihai Meiri, Ramat Hasharon (IL); Zeev Zalevsky, Rosh HaAyin (IL)

(73) Assignees: UNIVERSITY OF UTAH RESEARCH FOUNDATION, Salt Lake City, UT (US); BAR-ILAN UNIVERSITY, Ramat Gan (IL)

( * ) Notice: Subject to any disclaimer, the term of this patent is extended or adjusted under 35 U.S.C. 154(b) by 28 days.

(21) Appl. No.: 14/772,219

(22) PCT Filed: Mar. 13, 2014

(86) PCT No.: PCT/US2014/025585
§ 371 (c)(1),
(2) Date: Sep. 2, 2015

(87) PCT Pub. No.: WO2014/172035
PCT Pub. Date: Oct. 23, 2014

(65) Prior Publication Data
US 2016/0004059 A1    Jan. 7, 2016

Related U.S. Application Data

(60) Provisional application No. 61/792,275, filed on Mar. 15, 2013.

(51) Int. Cl.
*G02B 21/00* (2006.01)
*G02B 27/44* (2006.01)
(Continued)

(52) U.S. Cl.
CPC ....... *G02B 21/0072* (2013.01); *G02B 21/008* (2013.01); *G02B 21/0056* (2013.01);
(Continued)

(58) Field of Classification Search
CPC .......... G02B 5/00; G02B 5/18; G02B 5/1814; G02B 5/1819; G02B 5/1823;
(Continued)

(56) References Cited

U.S. PATENT DOCUMENTS 4,786,124 A * 11/1988 Stone ................. G01D 5/38
                                                      359/15
5,537,252 A *  7/1996 Rauch ................ G02B 5/1871
                                                      359/569

(Continued)

FOREIGN PATENT DOCUMENTS

WO    2001078012    10/2001

OTHER PUBLICATIONS

Weinberg et al, "Interferometer based on four diffraction gratings", Journal of Scientific Instruments, vol. 36, May 1959, pp. 227-230.*

(Continued)

*Primary Examiner* — Thong Q Nguyen
(74) *Attorney, Agent, or Firm* — Michael Best & Friedrich LLP

(57) ABSTRACT

A microscopy system which includes a light source for illuminating a sample; an objective lens for capturing light emitted from the illuminated sample to form a signal beam; and a dispersive optical element through which the signal (Continued)

beam is directed, wherein the dispersive optical element converts the signal beam to a spatially coherent signal beam.

21 Claims, 13 Drawing Sheets
(13 of 13 Drawing Sheet(s) Filed in Color)

(51) Int. Cl.
G02B 21/16 (2006.01)
G02B 27/42 (2006.01)
G01B 9/04 (2006.01)

(52) U.S. Cl.
CPC ..... *G02B 21/0064* (2013.01); *G02B 21/0076* (2013.01); *G02B 21/16* (2013.01); *G02B 27/4227* (2013.01); *G01B 9/04* (2013.01)

(58) Field of Classification Search
CPC .. G02B 5/1842; G02B 5/1861; G02B 5/1866; G02B 5/1871; G02B 5/1876; G02B 21/00; G02B 21/0016; G02B 21/002; G02B 21/0052; G02B 21/0056; G02B 21/006; G02B 21/0064; G02B 21/0076; G02B 21/008; G02B 27/42; G02B 27/4205; G02B 27/4227
See application file for complete search history.

(56) References Cited

U.S. PATENT DOCUMENTS

| | | | |
|---|---|---|---|
| 7,609,392 B2 | 10/2009 | Yaqoob et al. | |
| 8,369,642 B2 | 2/2013 | Findlay et al. | |
| 2002/0122256 A1* | 9/2002 | Mitamura | G02B 6/2931 359/577 |
| 2003/0123159 A1* | 7/2003 | Morita | G02B 5/1842 359/742 |
| 2006/0109532 A1* | 5/2006 | Savas | G02B 5/1857 359/10 |
| 2010/0214404 A1 | 8/2010 | Chen et al. | |
| 2014/0078298 A1* | 3/2014 | Kudenov | G01J 3/2803 348/135 |

OTHER PUBLICATIONS

D. W. Pohl, W. Denk, and M. Lanz, "Optical stethoscopy: Image recording with resolution $\lambda/20$," Applied Physics Letters, vol. 44, No. 7, p. 651, 1984.
U. Dürg, D. W. Pohl, and F. Rohner, "Near-field optical-scanning microscopy," Journal of Applied Physics, vol. 59, No. 10, p. 3318, 1986.
E. Betzig, A. Lewis, A. Harootunian, M. Isaacson, and E. Kratschmer, "Near Field Scanning Optical Microscopy (NSOM):: Development and Biophysical Applications," Biophysical Journal, vol. 49, No. 1, pp. 269-279, 1986.
E. Betzig, M. Isaacson, and A. Lewis, "Collection mode near-field scanning optical microscopy," Applied physics letters, vol. 51, No. 25, pp. 2088-2090, 1987.
Y. Inouye and S. Kawata, "Near-field scanning optical microscope with a metallic probe tip," Optics letters, vol. 19, No. 3, pp. 159-161, 1994.
M. G. L. Gustafsson, "Nonlinear structured-illumination microscopy: wide-field fluorescence imaging with theoretically unlimited resolution," Proceedings of the National Academy of Sciences of the United States of America, vol. 102, No. 37, p. 13081, 2005.
R. Heintzmann, T. M. Jovin, and C. Cremer, "Saturated patterned excitation microscopy—a concept for optical resolution improvement," JOSA A, vol. 19, No. 8, pp. 1599-1609, 2002.
M. G. L. Gustafsson, "Surpassing the lateral resolution limit by a factor of two using structured illumination microscopy," Journal of Microscopy, vol. 198, No. 2, pp. 82-87, 2000.

S. W. Hell and M. Kroug, "Ground-state-depletion fluorscence microscopy: A concept for breaking the diffraction resolution limit," Applied Physics B: Lasers and Optics, vol. 60, No. 5, pp. 495-497, 1995.
S. W. Hell and J. Wichmann, "Breaking the diffraction resolution limit by stimulated emission: stimulated-emission-depletion fluorescence microscopy," Optics letters, vol. 19, No. 11, pp. 780-782, 1994.
M. J. Rust, M. Bates, and X. Zhuang, "Sub-diffraction-limit imaging by stochastic optical reconstruction microscopy (STORM)," Nat Meth, vol. 3, No. 10, pp. 793-796, Oct. 2006.
E. Betzig, G. H. Patterson, R. Sougrat, O. W. Lindwasser, S. Olenych, J. S. Bonifacino, M. W. Davidson, J. Lippincott-Schwartz, and H. F. Hess, "Imaging Intracellular Fluorescent Proteins at Nanometer Resolution," Science, vol. 313, No. 5793, pp. 1642-1645, Sep. 2006.
G. H. Patterson, "A Photoactivatable GFP for Selective Photolabeling of Proteins and Cells," Science, vol. 297, No. 5588, pp. 1873-1877, Sep. 2002.
R. E. Thompson, D. R. Larson, and W. W. Webb, "Precise Nanometer Localization Analysis for Individual Fluorescent Probes," Biophysical Journal, vol. 82, No. 5, pp. 2775-2783, May 2002.
T. A. Klar and S. W. Hell, "Subdiffraction resolution in far-field fluorescence microscopy," Optics letters, vol. 24, No. 14, pp. 954-956, 1999.
T. A. Klar, S. Jakobs, M. Dyba, A. Egner, and S. W. Hell, "Fluorescence microscopy with diffraction resolution barrier broken by stimulated emission," Proceedings of the National Academy of Sciences, vol. 97, No. 15, p. 8206, 2000.
M. Dyba and S. W. Hell, "Focal Spots of Size $\lambda/23$ Open Up Far-Field Florescence Microscopy at 33 nm Axial Resolution," Physical Review Letters, vol. 88, No. 16, Apr. 2002.
V. Westphal, L. Kastrup, and S. W. Hell, "Lateral resolution of 28 nm ($\lambda/25$) in far-field fluorescence microscopy," Applied physics. B, Lasers and optics, vol. 77, No. 4, pp. 377-380, 2003.
V. Westphal and S. W. Hell, "Nanoscale resolution in the focal plane of an optical microscope," Physical review letters, vol. 94, No. 14, p. 143903, 2005.
G. Donnert, J. Keller, R. Medda, M. A. Andrei, S. O. Rizzoli, R. Lührmann, R. Jahn, C. Eggeling, and S. W. Hell, "Macromolecular-scale resolution in biological fluorescence microscopy," PNAS, vol. 103, No. 31, pp. 11440-11445, Aug. 2006.
S. T. Hess, T. P. K. Girirajan, and M. D. Mason, "Ultra-High Resolution Imaging by Fluorescence Photoactivation Localization Microscopy," Biophysical Journal, vol. 91, No. 11, pp. 4258-4272, Dec. 2006.
H. Shroff, C. G. Galbraith, J. A. Galbraith, and E. Betzig, "Live-cell photoactivated localization microscopy of nanoscale adhesion dynamics," Nature Methods, vol. 5, No. 5, pp. 417-423, 2008.
S. A. Jones, S.-H. Shim, J. He, and X. Zhuang, "Fast, three-dimensional super-resolution imaging of live cells," Nat. Methods, vol. 8, No. 6, pp. 499-508, Jun. 2011.
C. Ebeling, A. Meiri, R. Menon, E. M. Jorgensen, Z. Zalevsky, and J. Gerton, "Increasing localization sensitivity in stochastic reconstruction optical microscopy with an interference confocal microscope," In Preparation.
Z. Zalevsky and V. Eckhouse, "In-Channel OSNR and BER Measurement Using Temporal Superresolution Via Dynamic Range Conversion," J. Lightwave Technol., vol. 21, No. 11, p. 2734, Nov. 2003.
J. Solomon, Z. Zalevsky, and D. Mendlovic, "Superresolution by use of code division multiplexing," Applied optics, vol. 42, No. 8, pp. 1451-1462, Mar. 2003.
D. Wildanger, et al, "Solid immersion facilitates fluorescence microscopy with nanometer resolution and sub-angstrom emitter localization," Adv. Mat. DOI: 10.1002/adma.201203033 (2012).
Sean B Andersson. Localization of a fluorescent source without numerical fitting. Optics Express, 16(23):18714-18724, Nov. 2008.
Ricardo Henriques, Mickael Lelek, Eugenio F Fornasiero, Flavia Valtorta, Christophe Zimmer, and Musa M Mhlanga. QuickPALM: 3D real-time photoactivation nanoscopy image processing in ImageJ. Nature Methods, 7(5):339{340, May 2010.

(56) References Cited

OTHER PUBLICATIONS

David Mendlovic, Zeev Zalevsky, and Naim Konforti. Joint transform correlator with incoherent output. Journal of the Optical Society of America A: Optics and Image Science, and Vision, 11(12):3201-3205, 1994.

PCT Search Report and Written Opinion for International Application No. PCT/US2014/025585 dated Jul. 30, 2014.

Westphal et al., "Stimulated emission depletion microscopy on lithographic nanostructures," J. Phys. B: At. Mol. Opt. Phys. 28, S695-S705 (2005).

Yang et al., "Using high-contrast salty development of hydrogen silsesquioxane for sub-10 mm half-pitch lithography," J. Vac. Sci. Technol. B 25, 2025 (2007).

Shen et al., "Bias and Precision of the fluoroBancroft Algorithm for Single Particle Localization in Fluorescence Microscopy," IEEE Transactions on Signal Processing, vol. 59, No. 8, Aug. 2011, pp. 4041-4046.

Hamamatsu, Photomultiplier Tubes: Basics and Applications, 3rd Edition, Hamamatsu Photonics, 2007.

\* cited by examiner

COHERENT FLUORESCENCE SUPER-RESOLUTION MICROSCOPY

CROSS REFERENCE TO RELATED APPLICATIONS

This application is a national stage filing under 35 U.S.C. 371 of International Application No. PCT/US2014/025585, filed Mar. 13, 2014, which claims priority to U.S. Provisional Application No. 61/792,275, filed Mar. 15, 2013, which are incorporated herein by reference in their entireties.

BACKGROUND

The present invention relates to systems and methods for attaining resolution in light microscopy beyond the diffraction limit.

In traditional optical microscopy, the resolution of an image is limited by the Abbe criterion, which states that the smallest detail that can be resolved has a size of ~λ/2. This criterion is based on the shape of the Point-Spread Function (PSF) of the optical system, which is the shape of a point-like source that is imaged by the system. The resolution limitation impairs the ability to obtain structural information for biological molecules such as DNA, RNA, and proteins, whose relevant dimensions scale to a few nanometers.

Various methods have been developed in cell biology to image cellular structures with sub-wavelength resolution. However, among the shortcomings include the fact that the resolution in several of these methods is limited by the signal-to-noise ratio (SNR), which is determined primarily by the position-localization error of single-molecule detection.

Thus, improved methods for sub-wavelength optical microscopy are needed, including methods for reducing the position-localization error of single-molecule detection.

SUMMARY

Localization-based super-resolution techniques utilize photo-activated state-switching to individually isolate single emitting fluorophores and localize their position below the diffraction limit of classical optical microscopy. In conventional localization algorithms, the uncertainty in the position of the fluorophore scales inversely with the square root of the number of photons collected. For probes with a limited photon budget, this constrains the 'resolving' capabilities of pointillist-based imaging systems. Disclosed herein is a methodology based on using the phase information of the emitted photons to enhance the localization sensitivity in a laser-scanning photo-activation localization microscope by using a coherent detection scheme. The scheme employs interfering the emission signal with a reference beam, and employing a Leith-Upatnieks Hologram to spatially separate the resulting signal. Furthermore, the phase information of the signal is extracted using bit-encoding to enhance the localization algorithm, allowing for nanometer localization capabilities of an optical signal.

Accordingly, in one embodiment, the invention provides a microscopy system. The microscopy system includes a light source for illuminating a sample; an objective lens for capturing light emitted from the illuminated sample to form a signal beam; and a dispersive optical element through which the signal beam is directed, wherein the dispersive optical element converts the signal beam to a spatially coherent signal beam.

In another embodiment the invention provides a method of imaging a sample. The method includes steps of illuminating the sample with a light source; capturing light emitted from the sample with an objective lens to form a signal beam; and directing the signal beam through a dispersive optical element to convert the signal beam to a spatially coherent signal beam.

Other aspects of the invention will become apparent by consideration of the detailed description and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4a shows the two stages together, i.e. the grating system (G1-G4) followed by the correlator, and FIG. 4b shows the correlator structure in detail; the output of the correlator is directed to a photocathode.

FIG. 7a shows a Coherent PALM setup and FIG. 7b shows a Conventional (incoherent) PALM setup; the conventional approach may be obtained by simply blocking one of the arms of the grating system, eliminating the self-interference.

FIG. 9a shows total MSE and FIG. 9b shows MSE due to photon counting noise only.

FIG. 12a shows the entire PSF and the corresponding phase encoding, where the phase is encoded only to the right of the peak location for a size of a single pixel. FIG. 12b shows a closer look at the peak pixel and the pixel to the right for m=0. The entire phase is summed for the reading of the intensity of the pixel. FIG. 12c shows when m=4 the sum of the phase is 0 in the peak pixel, and in the pixel to the right of the peak, the sum is the same as in the case of m=0 for the peak pixel. FIG. 12d shows all 5 cases around the peak intensity pixel. It can be seen that for the different cases the sum of the phases is different.

DETAILED DESCRIPTION

Figure 1:
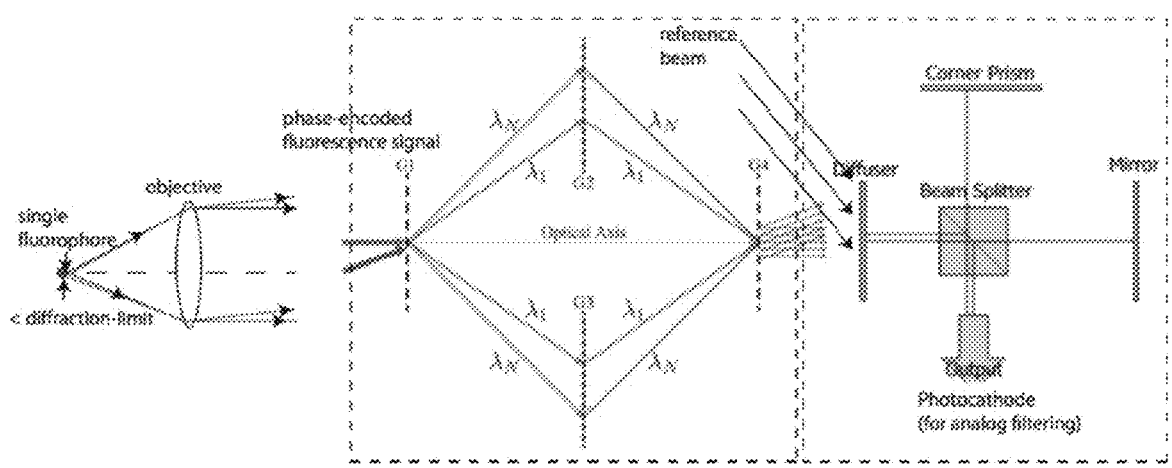
FIG. 1 shows a summary of an embodiment of a super-resolution microscopy system as disclosed herein, in which a phase-encoded fluorescent signal first passes through a grating-based interferometer and then interferes with a strong reference beam in a correlator setup, whose output is fed to an analog detector such as a photocathode for analog filtering; the result of these three innovations is an order of magnitude increase in resolution of the localization precision of the fluorophores, leading to sub-5 nm optical microscopy at high frame rates.
Figure 2A:
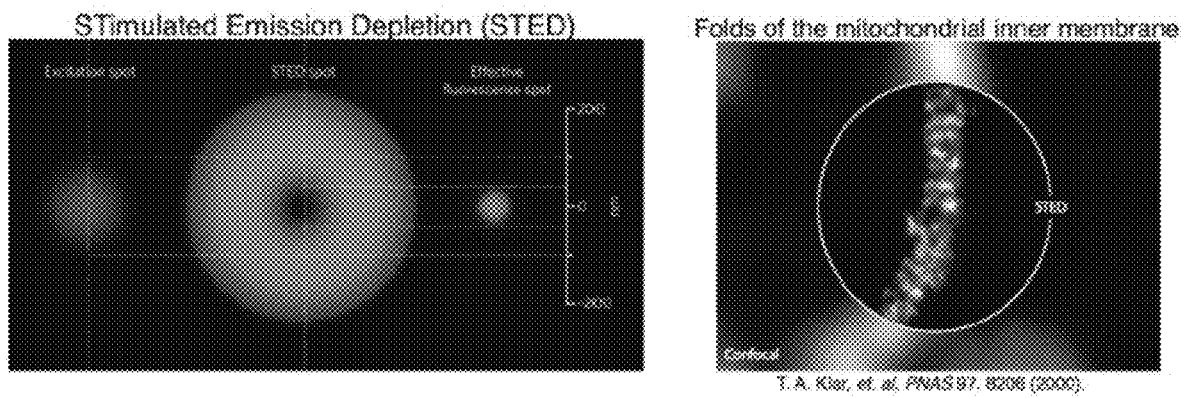
FIG. 2a shows an example of Stimulated Emission Depletion (STED) Microscopy in which a focused spot excites fluorescence and a ring-shaped beam quenches fluorescence from everywhere except its center; the signal is then collected from a sub-diffraction-limited region at the center of the second beam, where the right-hand panel shows a comparison of the confocal image and the STED image of the mitochondrial inner membrane.
Figure 2B:
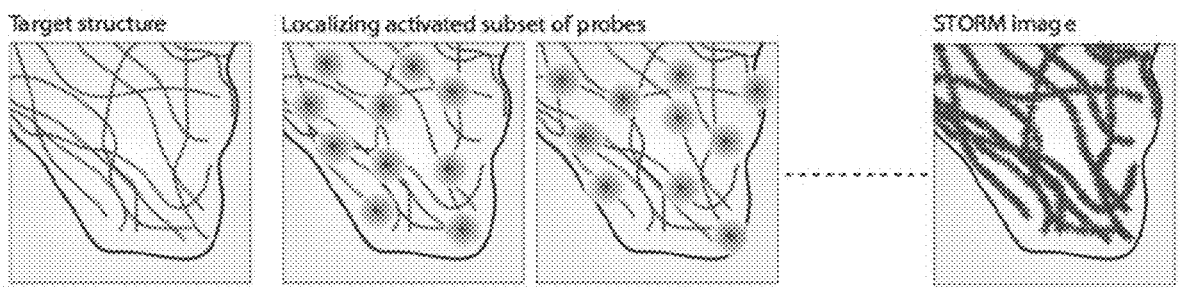
FIG. 2b shows a schematic diagram of Photoactivation Localization Microscopy (PALM), demonstrating how a PALM image is comprised of multiple frames taken at different instances of time that are post-processed into a single image.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Optical microscopy is one of the most widely used and versatile tools used in the study of molecular biology. Protein function and localization analysis can be performed by the genetic encoding of fluorescent proteins as markers onto proteins of interest, or with the tagging of organic fluorophores via antibody staining. The classical diffraction limit of optical microscopy, however, limits the resolving capabilities of such systems to approximately half the wavelength of the emitted fluorescence to approximately λ/2n sin α≈200 nm at best. While electron microscopy is able to achieve resolution at the nanometer scale and overcome the diffraction barrier of visible light, it lacks the ability to discriminate the wide variety of proteins within a biological sample as can be achieved with genetic encoding of fluorescent protein tags or antibody staining on proteins of interest and the various modalities of optical microscopy. Proteins, however, are two orders of magnitude smaller than the diffraction limit, generally a few nanometers in size; thus, the ability to use optical microscopy for the study of protein-protein interaction and co-localization at physiologically relevant nanometer length scales is precluded by the diffraction limit.

Embodiments of the invention encompass a novel technology for enhancing the resolution of fluorescence microscopes by utilizing the phase of the emitted photons. It is shown that by appropriate use of this phase information, it is possible to dramatically increase resolution with fewer photons, allowing for fast nanoscale imaging in 3D and particular embodiments are disclosed for implementation of this technology. The disclosed technology may be applied as a retrofit sub-system to existing microscopes, or as an entirely new microscope may be designed according to the prescribed conditions.

Resolution in super-resolution microscopy such as photo-activation localization microscope (PALM) or stochastic optical reconstruction microscopy (STORM) is limited by the localization precision, which, in turn is proportional to 1/sqrt(N), where N is the number of collected photons. In the present disclosure, it is shown that one can achieve localization precision that is proportional to 1/N. This is achieved by: (1) reduction in the effective size of the point-spread function (PSF) as a result of a novel grating system, (2) increase in the number of detected photons due to interference with a high intensity reference beam and (3) utilization of phase information in addition to the intensity of the signals using a novel optical correlator for optical filtering.

Individual fluorophores are localized using the photo-activation and analysis protocols typical of PALM. A laser scanning confocal or a wide field microscope setup is employed to record the emitted photons onto a detector. In the case of a laser scanning confocal, the detector may be a single pixel detector (such as an avalanche photodiode or APD), whereas in the case of a wide field microscope, a wide field detector (such as a CCD camera) may be used. In the confocal configuration, the signal beam is collimated with different points on the sample corresponding to different propagation angles relative to the optic axis (as shown on the left in FIG. 1). Photons emitted from two points on the fluorophore that are spaced below the diffraction limit may emerge after the objective at slightly different angles. This corresponds to different optical path lengths, which can then be distinguished in an interferometer as shown. Two matched pairs of novel diffraction gratings may be utilized in a Mach-Zehnder configuration to efficiently separate and then recombine the signal beam, as shown in FIG. 1. This forces photons in the signal beam to interfere with themselves, which will modulate the point spread function (PSF) resulting in a higher information content than the standard assumed Gaussian PSF. Subsequently, a strong reference beam (spectrally matched to the fluorophore but spatially coherent) may be used in a novel correlator configuration as well as analog filtering with a photocathode in order to further increase the localization error by a factor of ~5. Finally, a novel phase encoding scheme may be used which can rapidly identify the position of the fluorophore in the sample. As a consequence of these three enhancements to PALM, the resolution for the disclosed coherent-PALM may approach sub-5 nm with only ~500 detected photons, thereby allowing for rapid imaging.

Various techniques, such as 4Pi microscopy and $I^5M$, have resulted in an improvement of resolution towards 100 nm. However these techniques do not overcome the diffraction barrier and thereby are still limited to a few 100 nm resolution. Since the resolution limit is a result of diffraction, it applies only to the far field, where the optical detector is placed at a distance of multiple wavelengths from the sample. The interaction of light with the sample also generates a near field component, which does not undergo diffraction and thus, is not diffraction limited. The term 'near field' implies that this component exists only close to the sample, and indeed, it decays exponentially. By detecting this component, sub-wavelength resolution can be obtained. Nearfield-Optical-Scanning Microscopy (NSOM) achieves this. The first NSOM configurations used a probe tip with an aperture of tens of nanometers to illuminate the sample, where the resolution was limited by the diameter of the probe's aperture. An alternate approach is implemented in collection-mode NSOM, where the tip of an optical fiber with the sub-wavelength aperture is used to collect the light. Another variation of NSOM is the apertureless NSOM (aNSOM), where a metal tip is used to convert the evanescent wave component into a propagating field. In this configuration, both the illumination and the collection optics are placed in the far field.

Near field methods require the distance between the sample and the tip to be on the order of magnitude of the aperture (tens of nanometers). Therefore they have limited application in biology due to the difficulty of seeing (penetrating) into the biological sample. Recently, several methods have been able to produce images that are not diffraction limited in the far field. A family of methods called Reversible-Saturable-Optical-Fluorescence Transitions (RESLOFT) uses the transition between bright and dark states to selectively illuminate the sample in a region smaller than the diffraction limit. Saturated-Structured-Illumination Microscopy (SSIM) and Saturated-Pattern-Excitation Microscopy (SPEM) use Moiré fringes to move higher spatial frequencies into the optically resolvable region limited by diffraction. These Moiré fringes are generated by the product of the local density of fluorescent probes attached to the sample and the excitation light. While a similar method using linear illumination microscopy is capable of improving the resolution by a factor of two, an emission rate, which depends nonlinearly on the illumination intensity, can produce a theoretical unlimited resolution. Such emission rate is obtained by illuminating the sample with a sinusoidal pattern with peak intensity that is higher than the emission rate of the fluorophore. The result is emission with a nonsinusiodal rate, which contains higher spatial frequencies than the illumination pattern itself.

Two practical implementations of RESOLFT, namely Ground-State-Depletion (GSD) and Stimulated-Emission-Depletion microscopy (STED), use two laser beams. The excitation beam is used to excite the fluorophores into their bright state, while the second beam is used to force the excited molecules into their dark state. In STED, the excitation light is focused onto a spot in the sample and is diffraction limited. The second beam, which results in stimulated emission (called the STED beam) has a doughnut shape and is also focused on the same spot as the excitation beam. Since the STED beam, which has a high intensity, prevents fluorescence where it is present (including where it overlaps the excitation beam), no fluorescence photons are emitted. Only in the very center of the STED beam, where its intensity is zero (and the intensity of the excitation beam is maximal), the molecules fluoresce in a region much smaller than the diffraction limit. The same process is repeated many times over the sample, as it is scanned by the two beams to create an image with a resolution, which is much higher than the diffraction limit.

A different approach is taken in the related approaches termed Stochastic-Optical-Reconstruction Microscopy (STORM) and Photoactivation-Localization Microscopy (PALM). In these methods, photoactivatable molecules are used to perform time-multiplexed superresolution. The fluorescent molecules are illuminated by a pump laser beam. This pump illumination statistically activates some of the molecules into a fluorescing state. Since the active molecules are well separated (spatially sparse compared to the diffraction limit), they can be localized by Gaussian fitting. The molecules are then photobleached and another cycle of activation-localization photobleaching is performed. With sufficient number of such cycles, every fluorophore in a field of view can be probed. Finally, all the localization data is used to reconstruct a super-resolved image.

Scanning PALM

Figure 3:
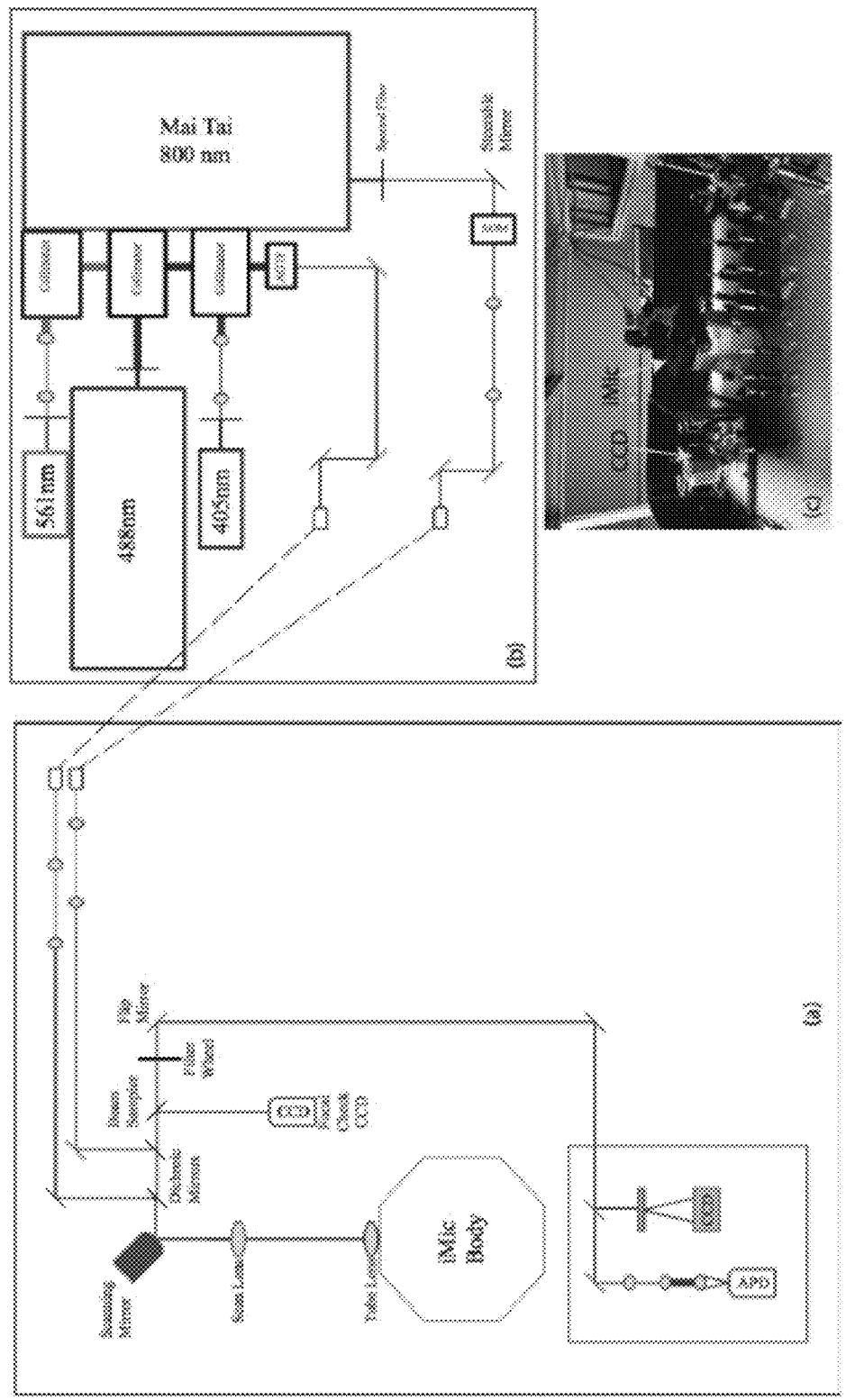
FIGS. 3a and 3b show a schematic of a scanning-PALM system according to embodiments of the invention.
FIG. 3c shows a photograph of one particular embodiment of a scanning-PALM system.

In the version of PALM utilized in this proposal, a focused spot (under an oil immersion objective) is quickly scanned across the sample. The image integrated during one such scan over the field of view is referred to as a frame. Many such frames are captured such as the case in conventional wide field PALM. As illustrated in FIG. 3a, the signal is collected by the same objective (so-called epi-fluorescence configuration) and the same scan mirror "de-scans" the signal beam. Thereby, at each instant of time a collimated signal beam is directed towards the detector, typically an avalanche photo-diode (APD). Each such frame is then post-processed as in conventional PALM, i.e., each fluorophore is fitted with a Gaussian. The uncertainty in the position of the centroid of the Gaussian is inversely proportional to the square root of the number of photons detected from it. This version of PALM allows one to achieve much lower background than that in wide field PALM. In addition due to the stronger excitation, higher number of photons may also be obtained from each fluorophore. Finally, this configuration produces a collimated signal beam at each instant of time. Since the confocal configuration is used, it is possible to achieve 3D imaging as well. The fluorophores are typically randomly oriented in the sample. Those fluorophores whose dipole moments are orthogonal to the excitation light will not be imaged under wide field illumination. This problem can be avoided in scanning PALM due to the high-NA of the objective lens, which results in axially as well as transverse polarized fields at the focus.

Coherent Fluorescence Super-Resolution Microscopy

The methods disclosed above may be used to image cellular structures with sub-wavelength resolution. However, the resolution in PALM and STORM is limited by the signal-to-noise ratio (SNR), determined primarily by the position-localization error of single-molecule detection. In the conventional approaches, in which incoherent light is used, this error is proportional to $1/\text{sqrt}(N)$, where N is the number of collected photons.

Embodiments of this invention utilize coherent interaction between the signal photons in a custom built PALM system in order to:

Drastically increase the resolution of fluorescence imaging to below 5 nm by utilizing coherent detection. The primary tool, which is used to obtain the increase in resolution is the phase information (in addition to the intensity). Current pointillist microscopy methods (e.g. PALM and STORM) use only the intensity of the fluorescent signal in order to localize the molecule. In addition, using a reference light source, an increase in the number of detected photons can be obtained, thus resulting in another increase in resolution.

Allow faster nanoscale imaging: coherent detection requires smaller number of detected photons, due to the use of a reference light source and the greater immunity of the phase estimation method (see below) to the SNR; thus reducing the acquisition time of each frame.

Theory

The improvement in localization error is obtained due to three factors: (1) reduction in the effective size of the point-spread function (PSF) as a result of a grating system, (2) increase in the number of detected photons due to interference with a high intensity reference wave and (3) utilization of phase information in addition to the intensity of the signals rather than intensity only as in existing localization-microscopy methods. These improvements are accomplished with a 2-stage system, incorporated into a conventional scanning-PALM system. The novelty of the approach is the use of the phase information to obtain higher resolution than other superresolution techniques. This phase information is used in a direct and indirect ways to accomplish the improvement. This is contrary to existing state of the art methods mentioned above, that use only the intensity of the signal. The difficulty to obtain phase information lies in the fact that the detector captures only the intensity of the signal. The disclosed system is able to extract the phase information and use it for a significant improvement in the localization of the fluorescent probe. Since the phase information is destroyed in incoherent illumination, coherent interaction is required.

Figure 4:
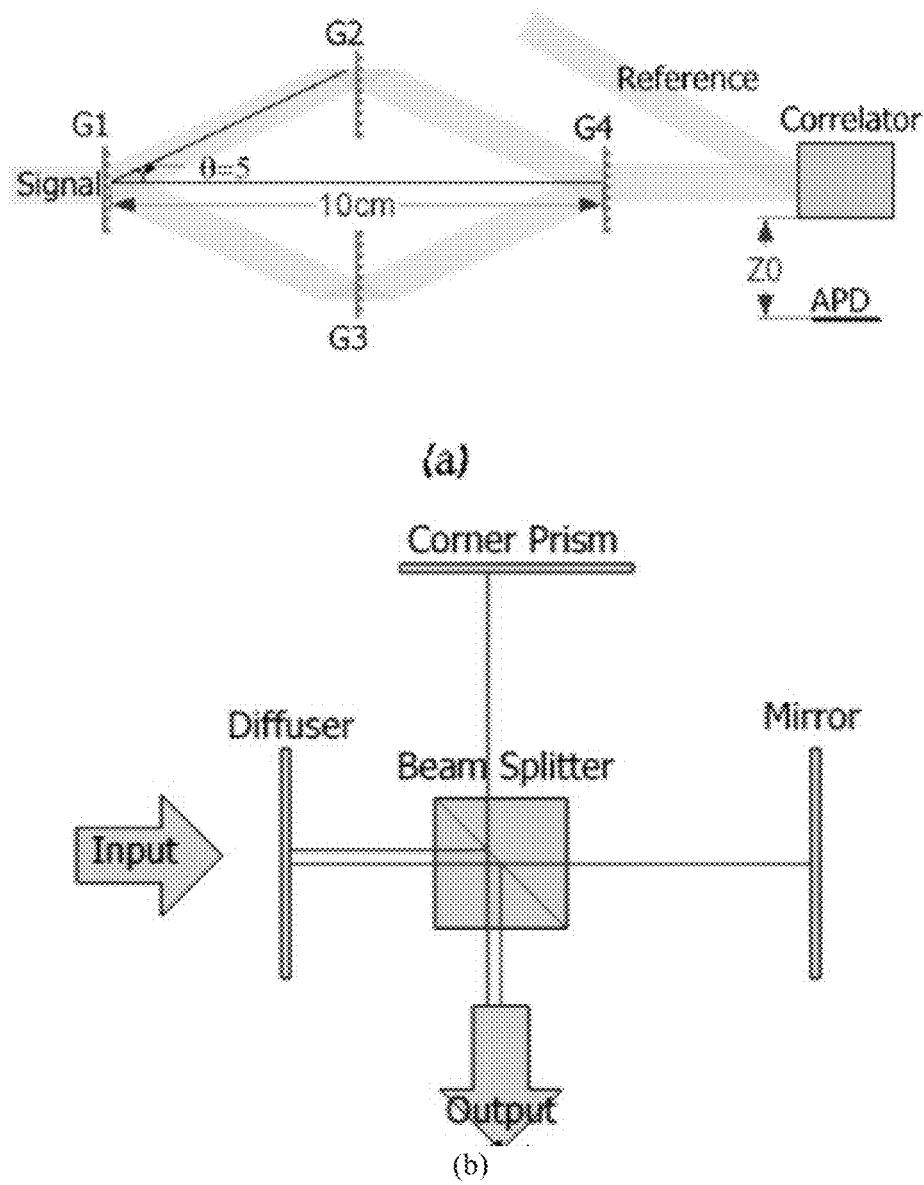
FIGS. 4a and 4b show a grating system and a correlator, where

The first stage of the system is illustrated in FIG. 4a. It is comprised of a grating system, which includes two pairs of identical binary-phase diffraction gratings: G1-G4 and G2-G3. The G1-G4 grating pair is designed for maximum transmission in the first diffraction order, while the G2-G3 pair has maximum transmission in the second diffraction order. This self-interference system can be shown to reduce the effective size of the PSF by a factor of 5.2. The reduction of the effective size of the PSF here is accomplished by self-interference patterns at the output of the grating system, which modulate the PSF with a sinusoidal pattern and can be viewed as an indirect utilization of the phase information. In various embodiments, other dispersive optical elements such as diffractive optics, holographic optical elements, or refractive optical elements can be used instead of diffraction gratings to generate a spatially coherent beam.

The second stage of the system introduces an additional high power reference beam with the same spectrum as the signal. This reference beam can be readily generated with a supercontinuum source that is broadband (over the spectral width of the fluorescent emission), has high power and is also spatially coherent. The goal in this stage is to obtain a mixed-field term, which has a higher photon count than the signal alone due to the high intensity of the reference beam. In this method, based on the Leith-Upatnieks Hologram, the reference beam is a plane wave incident on a correlator at an angle, $E_2 e^{2\pi i \alpha x}$, in addition to the signal from the output of the grating system $E_1$, see FIG. 4a. The internal structure of the correlator is shown in FIG. 4b, and the output of the correlator system is composed of three terms $I = I_c + I_f + I_d$. The last term, $I_d$, is greatest interest and is described by:

$$I_d = \frac{2E_2}{\lambda^2 z_0^2} \int E_1(x) e^{-j\frac{4\pi}{\lambda z_0} x(\xi+\alpha/2)} dx + \frac{2E_2}{\lambda^2 z_0^2} \int E_1(x) e^{-j\frac{4\pi}{\lambda z_0} x(\xi-\alpha/2)} dx \quad (1)$$

Here $\lambda$ is the wavelength, $z_0$ is the free space propagation distance between the output of the correlator and the detector, and $x, \xi$ are the object and the image plane coordinates, respectively. The output of the correlator is separated into three orders: the $I_c$, $I_f$ terms are centered at $\xi=0$ and the two terms of $I_d$ are centered at $\xi=\pm\alpha/2$, respectively. Of interest is $I_d$, and $\xi=\pm\alpha/2$ determine the locations of the two detectors. Since $E_2$ is a plane wave, it does not contain spatial information, however it overlaps $I_d$ and contributes to the photon count noise (i.e. in terms of the estimation process, $E_2$ is pure noise). The use of a photocathode enables one to eliminate the contribution of $E_2$ prior to the introduction of the photon counting noise by performing a Fourier transform on the entire signal and blocking the DC term of $E_2$.

After inverse Fourier transform, the number of photons incident on the two detectors in the output of the correlator is now $n = \sqrt{n_1 n_2}$ where $n_1$ and $n_2$ are the number of photons associated with the fields $E_1$ and $E_2$, respectively and the estimation error is proportional to $\frac{1}{2}\sqrt{n_1 n_2}$. As the intensity of the reference beam can be controlled, one can use a reference beam with an intensity much higher than the signal, $n_2 \gg n_1$. Since the error in the conventional incoherent PALM method is proportional to $1/\sqrt{n_1}$, it can be seen that the error in the coherent case is much lower (since $\frac{1}{2}\sqrt{n_1 n_2} \ll 1/\sqrt{n_1}$.

Since the intensity in equation (1) is proportional to the signal electric field $E_1$, the phase information is maintained at the output of the system. This additional information can be exploited in order to obtain a lower estimation error. Following equation (1), the intensity at one detector is integrated over pixel m. This intensity can be written as a product of amplitude and phase term $I_m(\lambda) = Ae^{i\delta_m}$. If the object plane is divided into discrete locations $x = n\Delta x$ this intensity can also be written as $$I_m(\lambda) = \sum_{n \in \{x_m\}} B_n e^{i\phi(n\Delta x)} = Ae^{i\delta_m}. \quad (2)$$

where $B_n$ is proportional to the amplitude of the electric field $E_1(x)$. The PSF of the optical system is encoded with a phase, which is changed with the location of the center of the PSF. This encoding method ensures that the phases in the sum of equation (2) are different for every location. Since there is a one to one relation between $\delta_m$ and the phases in the sum, the exact PSF center location can be found by means of a simple look up table. In other words, the phase information is used to directly localize the fluorescent probe.

Simulation Results

The significance of coherent detection can be quantified by calculating the improvement due to each of the three aforementioned factors individually. According to calculations, the use of the grating system can reduce the estimation error by a factor of ~5.2.

Figure 5:
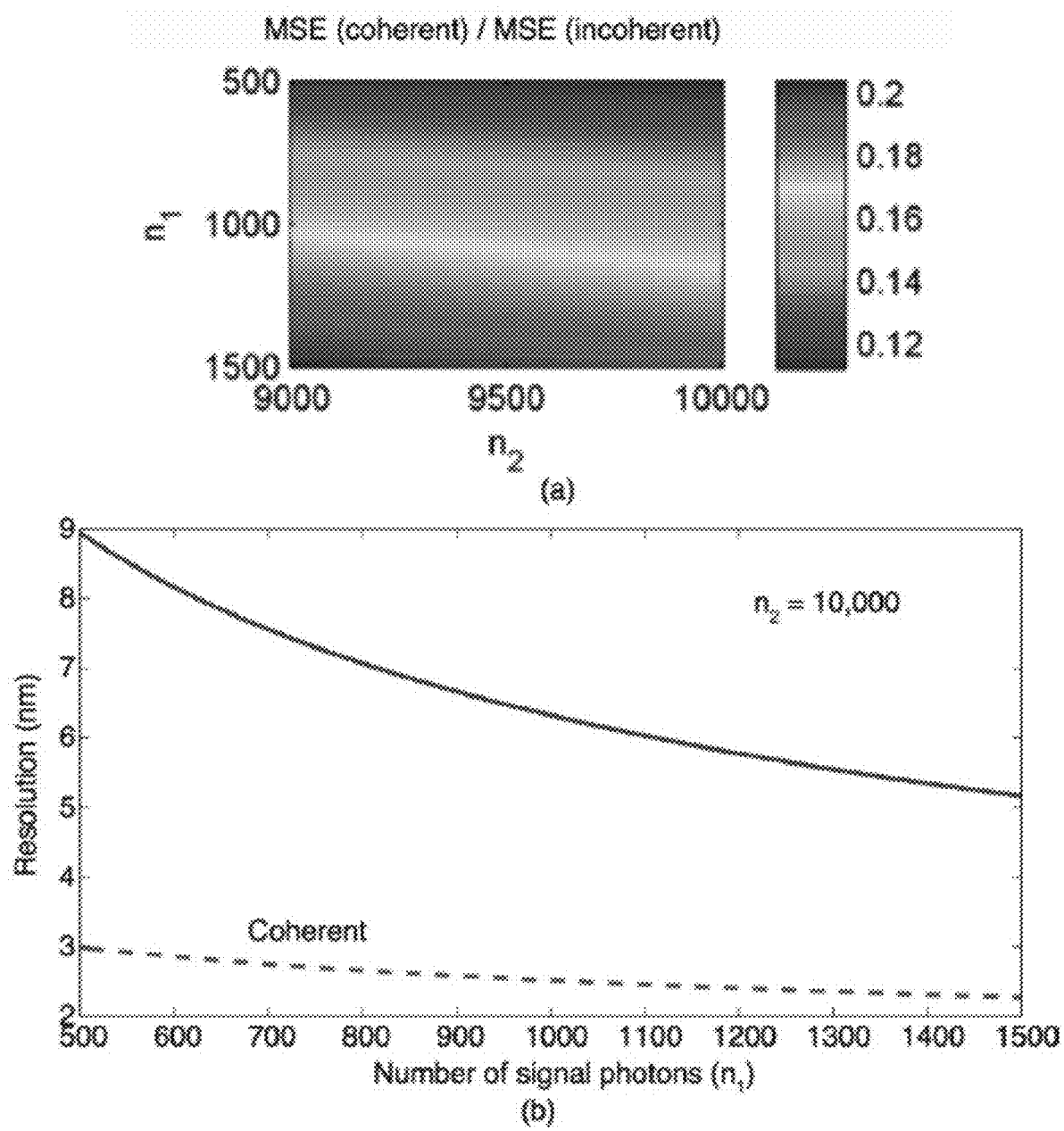
FIG. 5a shows mean-square-localization-error ratio between coherent and incoherent case when $n_2 \gg n_1$ and the reference beam is incident at an angle.
FIG. 5b shows resolution as measured by square root of the mean-square-localization error (for 1D case) as a function of the number of signal photons for the coherent (dashed line) and incoherent (solid line) cases; the coherent scheme allows for localization precision that is almost 5 times better than the incoherent case for low signal photon counts ($n_1 \sim 500$).

The improvement as a result of the increased photon count due to the introduction of the reference beam is revealed by calculating the ratio of estimation error between the coherent and incoherent case as plotted in FIG. 5. The reduction of the size of the PSF as a result of the grating system was not taken into account in the calculation of this error. It can be seen that the error in the coherent case is less than 20% of that in the incoherent case. Clearly, as the number of photons gets smaller, the coherent method performs even better than the incoherent case. The coherent detection scheme allows achieving fast imaging (with fewer photons) with very high spatial resolution. According to simulation results, by directly using the phase information further improvement can be obtained by a factor of at least 2 for low photon counts.

Experimental Design and Methods

Figure 6:
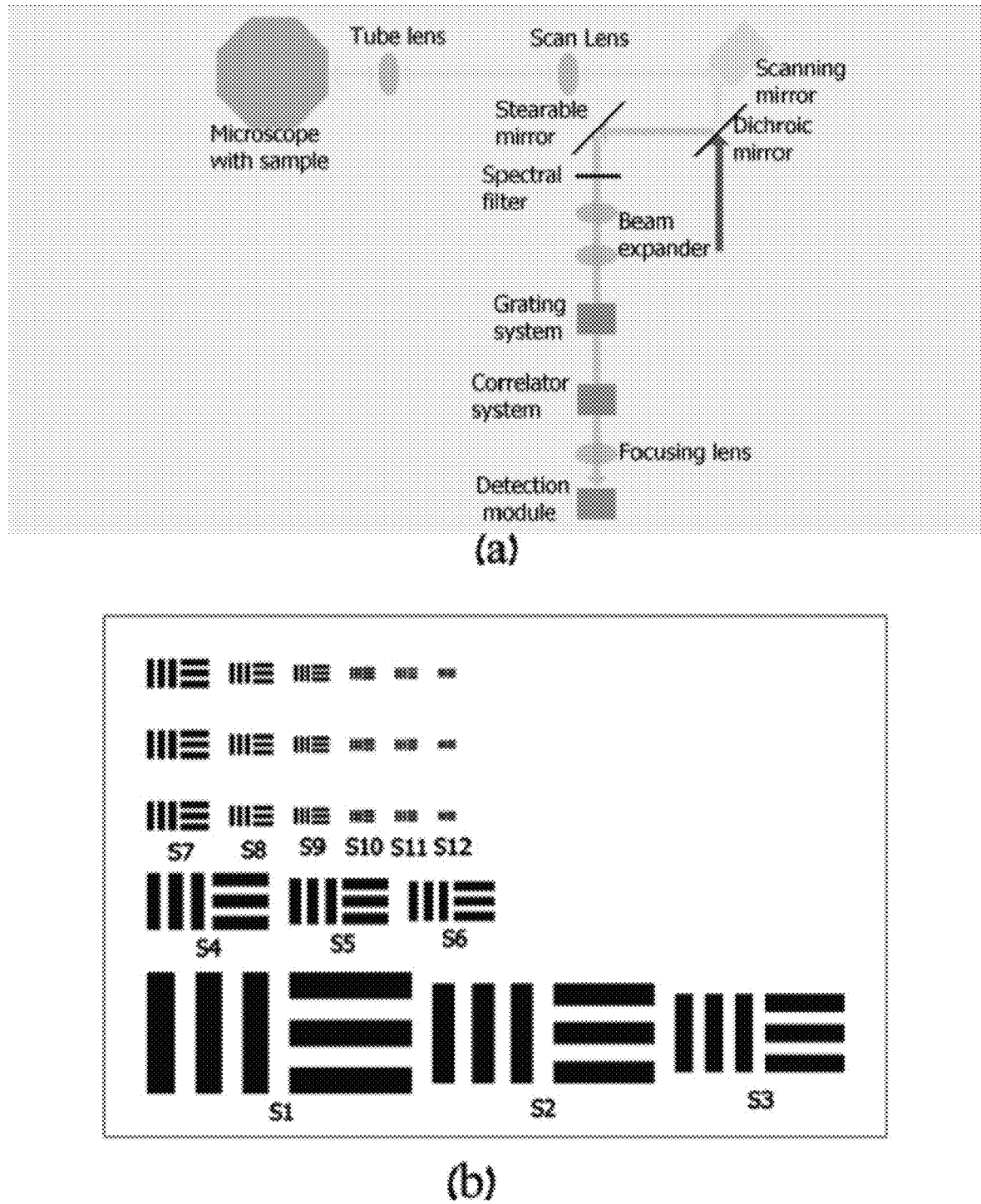
FIG. 6a shows a diagram of an experimental setup according to an embodiment of the invention, where the vertical arrow pointing towards the dichroic mirror indicates the path of the input beam, while the arrows from the dichroic mirror to the steerable mirror and from the steerable mirror to the detection module indicates the path of the output beam.
FIG. 6b shows an example of a resolution target.

Embodiments of the disclosed methods may be carried out in parts using the setup illustrated in FIG. 6a. In this sketch the second stage of the system is composed of two modules: The correlator system of FIG. 4b and a detection module, which eliminates the background reference field and performs the detection. The obtained resolution may be determined using a resolution target, see example in FIG. 6b. The resolution target may be fabricated using scanning-electron-beam lithography on a fluorescent-doped polymer resist such as PMMA.

Testing the Grating System

Figure 7:
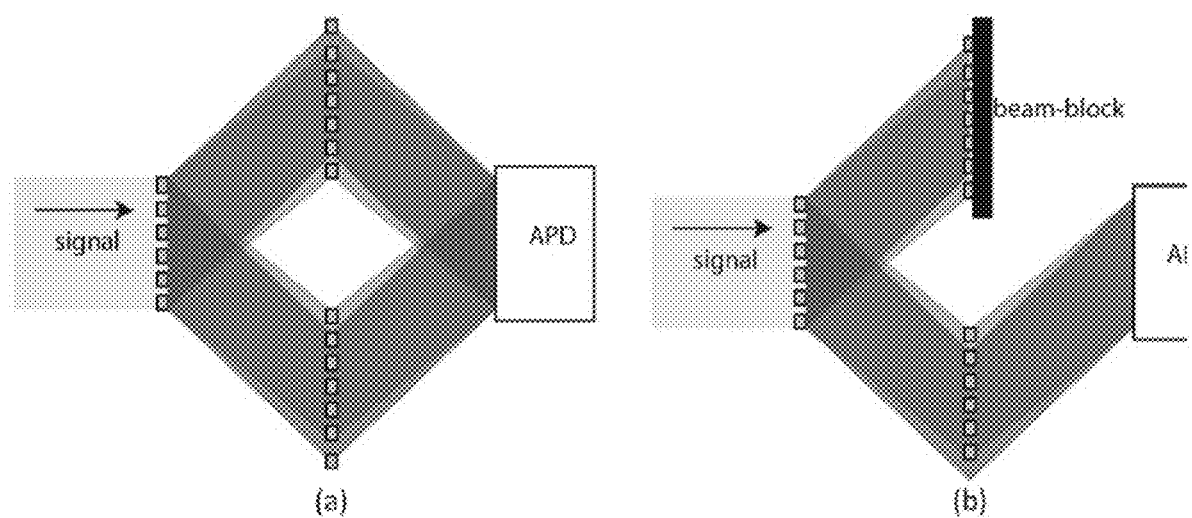
FIGS. 7a and 7b show an experimental setups for a grating system for use with embodiments of the invention, where

In the first stage of the project, the grating system may be tested and to determine its influence on the PSF size. Here the gratings are incorporated into the system and the obtained resolution tested using a resolution target. These results are compared to a regular PALM system. An embodiment of a system that can be used for this purpose is depicted in FIGS. 7a and 7b. The comparison to the regular PALM system can be performed by blocking one of the arms of the grating system as indicated in FIG. 7b.

In order to perform a correct comparison, it is necessary to account for the reduction in the number of photons as a result of the block. It is considered a successful outcome if resolution in the coherent case (FIG. 7a) is at least twice the resolution in the incoherent case (FIG. 7b). One should note that the deterioration in the resolution in the incoherent case as a result of the blocking of half the photons is by a factor of 2, therefore any improvement beyond that factor can be attributed to the coherent PALM approach, i.e. the grating system. A different method to compare is to use a beam splitter in order to eliminate half of the photons in the coherent case, just before the first grating in FIG. 6a. Here, a resolution that is better than in the incoherent case is considered as successful demonstration of the proposed approach. Both of these methods are utilized for preliminary experiments.

Correlator System Evaluation

The next stage is devoted to the correlator system and phase estimation. At first, this subsystem is tested separately, where the ability to eliminate a background field is examined. An object is imaged and a background constant field is added. Then, a beam splitter and two detectors is used. On one, the disclosed system is used to eliminate the background field, and on the other, the background field is eliminated separately. The shot noise is expected to be significantly lower in the first case, since when the background field is digitally eliminated, the shot noise is already present. The software may be adapted to the phase estimation scheme presented and the ability to estimate the phase may be analyzed. The ability to estimate the phase may be tested using a resolution target with different phases in different areas. First, large areas of a few wavelengths may be used, and subsequently the size may be reduced to establish the smallest area in which the phase may be estimated. After these steps, the correlator and phase estimation module may be incorporated into the system (at this stage without the grating system) and the obtained resolution may be examined using a resolution target. In this stage the phase may be a simple linear phase.

Optimization of Phase Estimation

The obtained resolution highly depends on the ability to estimate the phase (or the phase related location of the fluorescent probe). Phase encoding may be optimized for the purpose of reducing the localization error. In this stage, a phase element, which optimizes the ability to reduce the localization error, may be designed and simulated prior to its fabrication. Later the phase element may be tested by incorporating only the correlator system into the setup. In the last step, the full setup may be tested with the new phase element, results of which may be compared to the previously obtained results with the linear phase.

Resolution Characterization

When the entire system is assembled, a resolution target may be used to determine the obtained resolution. The resolution-test standard may be patterned using scanning-electron-beam lithography (SEBL). The electron-resist may be poly-methylmethacrylate (PMMA) doped with multi-color fluorophores, for example fluorophore-labeled microspheres. Regions of PMMA that are exposed to a focused electron beam may undergo chain scission, which can increase those regions' solubility in a developer such as methyl isobutyl ketone (MIBK). However, the fluorophores may also undergo some bleaching due to chain scission. In order to quantify the relationship between topography and active-fluorophore distribution, one can compare images taken with the scanning-electron microscope, the atomic-force microscope, and conventional fluorescence confocal microscope with structures much larger than the diffraction limit. By utilizing techniques such as cold and salty development, structures can be created which have spacing slightly below 10 nm, permitting the limits of multi-color imaging technique to be investigated. Fine patterning with a focused-ion beam may also be used to create the finest features on the resolution target. PALM (both coherent and incoherent) images may be compared against atomic-force micrographs and scanning-electron micrographs for absolute and independent measurements of resolution. An alternative resolution target would be to utilize a nitrogen vacancy point defect in diamond, which consists of a lattice vacancy located next to a substitutional nitrogen, which act as atomic-scale fluorescent point sources. Isolated defects, whose spatial sizes are in the order of 2-3 nm, could be used to measure the PSF of the disclosed approach. Closely spaced defects could, furthermore be used to characterize resolution.

By measuring the image contrast as a function of spatial frequency, the modulation-transfer function (MTF) of the imaging technique can be determined experimentally. In the present case, the MTF 15 measured for both incoherent (conventional) and coherent PALM. In addition, this approach will quantification of the dependence of MTF on the properties of the fluorophores such as quantum yield, stokes shift, absorption cross-section, etc.

In view of the above considerations, embodiments of superresolution microscopy methods and systems are disclosed below.

As discussed above, pointillist-based approaches, such as (fluorescence) photoactivatable localization microscopy ((F) PALM), and stochastic optical reconstruction microscopy (STORM), have been able to circumvent the diffraction barrier by isolating individual molecules within a dense sample by utilizing photo-activated state-switching of the fluorescent markers. Individual molecules are stochastically activated across the sample, with most being greater than a diffraction-limited distance from their nearest activated neighbor. Each emitter's position can then be localized below the diffraction limit, and repeated rounds of photo-activation and readout can allow for a reconstructed image to be generated where the location of each emitter is known below the classical diffraction limit. In standard pointillist-based microscopy configurations, the localization of individual fluorophores is achieved via fitting either a Gaussian function or calibration PSF to the recorded data, with the uncertainty in the localization scaling as:

$$\langle (\Delta x)^2 \rangle = \frac{s^2 + a^2/12}{N} + \frac{8\pi s^4 b^2}{a^2 N^2} \quad (3)$$

where $\Delta x$ is the uncertainty in the localization position of the emitting fluorophore (for both x and y coordinates), s is the standard deviation of the emission PSF, a is the pixel size of the recorded image, and b is the background value. For systems with limited photon budgets, such as fluorescent protein based samples, this scaling factor limits the localization of the emitting fluorophore to approximately 40-50 nm. While this is much better than the diffraction limit in classical microscopy, it is still an order of magnitude larger than the size of individual proteins. Disclosed herein is a detection based-scheme employing interference to further improve the localizing capability of a pointillist-based microscopy system.

Coherent Detection

A standard optical microscope (confocal or wide field) delivers incoherent light collected from the sample onto some form of photodetector, either a photo-multiplier tube (PMT), an avalanche photo-diode (APD), or a CCD array, all of which solely record photon counts. The disclosed method involves generating a coherent output of photons via a modified detection path, and employing a reference signal to interfere with the emission signal before it is incident on the photodetector and utilizing the inherent phase information from the emission to localize the position of the emitting fluorophore to a greater degree of accuracy. A coherent stream of photons is generated by employing matched grating pairs, and the output from the grating system is mixed with a reference signal that shares the same spectrum as the fluorescence emission. An optical correlator may spatially separate the emission photons that interfere with the reference signal, and this is the signal that is recorded. A diagram of the detection path can be seen in FIG. 8.

For analysis, it is assumed that emission and reference signals are coherent and exhibit positive interference. In the case of two incoherent sources (where the proportionality constant is $\alpha = \eta/h\bar{\nu}$ there would be no interference, and the total signal at the detector would be the sum of the signal from the emission ($E_1$ with photon counts $n_1$) and the reference ($E_2$ with photon counts $n_2$), for a total recorded signal of $n=n_1+n_2$. For the case of two coherent sources, one instead would have:

$$n_1 + n_2 + 2\sqrt{n_1 n_2} \quad (4)$$

In (4), the second term can be thought of as background noise, while the first and the last terms represent the signal to isolate. In reality only the signal is of interest; therefore, the equation is written $$N = n_1 + 2\sqrt{n_1 n_2} \quad (5a)$$

$$b^2 = n_2 \quad (5b)$$

with N as the signal of interest, and b the background noise. Assuming that there is no additional background signal, the uncertainty in detection equals $$\sigma^2 = n_1 + 2\sqrt{n_1 n_2} + n_2 \quad (6)$$

where the first and second terms in (6) represent the signal to be isolated, and the last term can be considered noise. Note that (6) is true for every pixel, where $n_1$ is the expected photon count on a particular pixel, due to the particle to be localized.

Improvement in Localization Error Due to Coherent Scheme

Using (5a) and (5b) in (3), the total estimation error can be written as:

$$\langle (\Delta x)^2 \rangle = \frac{s^2}{n_1 + 2\sqrt{n_1 n_2}} + \frac{4 n_2 s^3 \sqrt{\pi}}{a(n_1 + 2\sqrt{n_1 n_2})^2} \quad (7)$$

as an expression for the localization error with an interfering reference beam. In order to compare between the coherent and incoherent cases, the mean square error (MSE) is examined for a range of values for $n_1$ and $n_2$ for the coherent case, where in the incoherent case one obtains $n_2=0$ (i.e. there is no reference signal), and $n_1$ takes the same values as in the coherent case.

Figure 9:
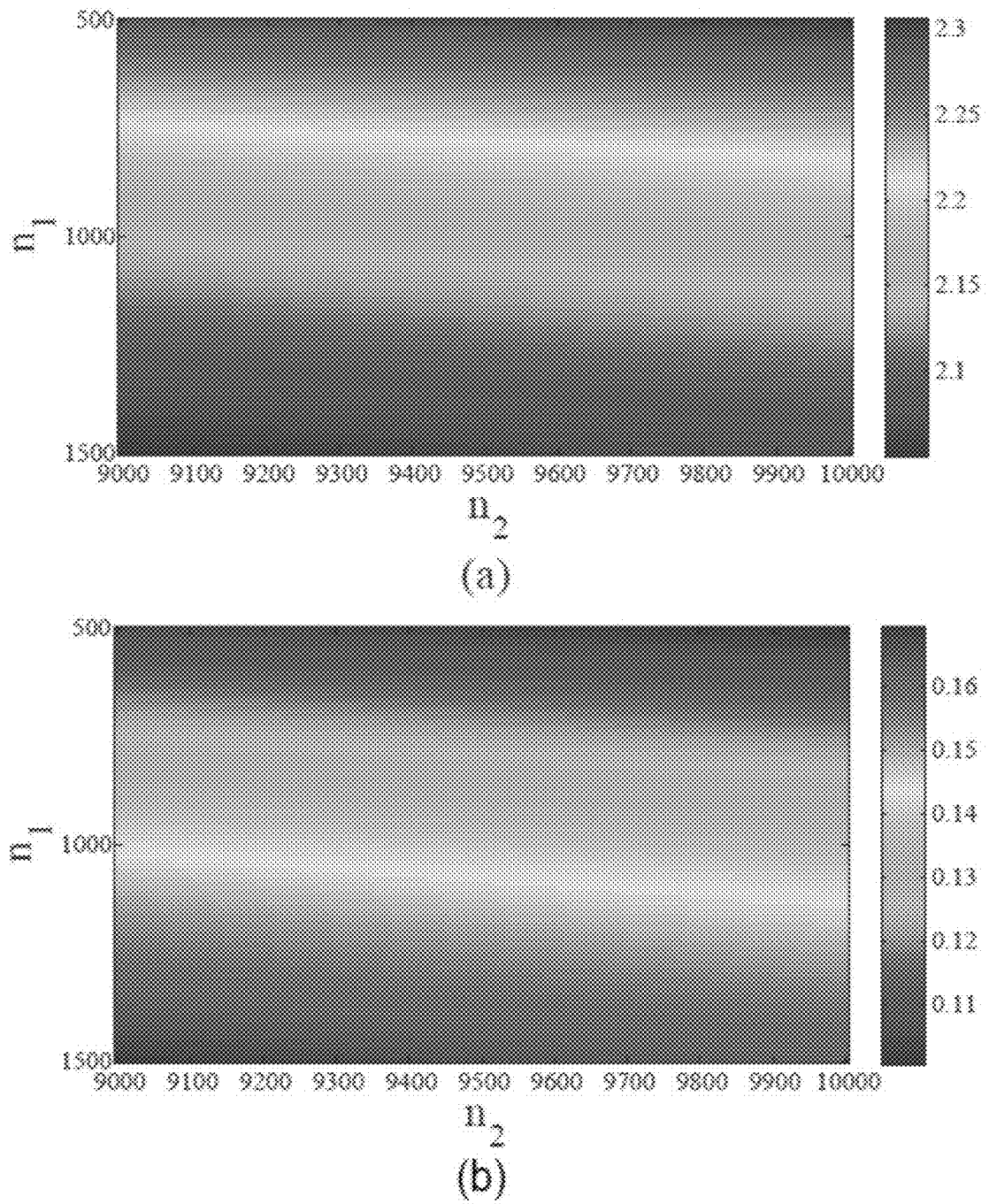
FIGS. 9a and 9b show a mean square error (MSE) ratio between coherent and incoherent cases when $n_2 \gg n_1$, where

The ratio of MSE between the coherent and incoherent cases can be seen in FIG. 9a, assuming that there is a strong reference signal ($n_2 \gg n_1$). While in the coherent case the error is higher than in the incoherent case, the error due to photon counting noise, as indicated by FIG. 9b, is much lower. The higher error in the coherent case is attributed to the additional background light due to the strong reference signal.

In order to increase the localization performance by utilizing the advantage of the improvement in the photon counting noise, one should eliminate the background intensity that stems from the reference beam without eliminating the influence of the reference field on the photon counting noise, i.e. eliminate the second term in (7). Eliminating the background intensity after the detection process takes place will not improve the results since the uncertainty in photon counts remains the same, and is equal to the average number of photon incident on the photo-detector. Therefore, the intensity of the reference beam should be eliminated before the statistical process takes place.

Figure 8:
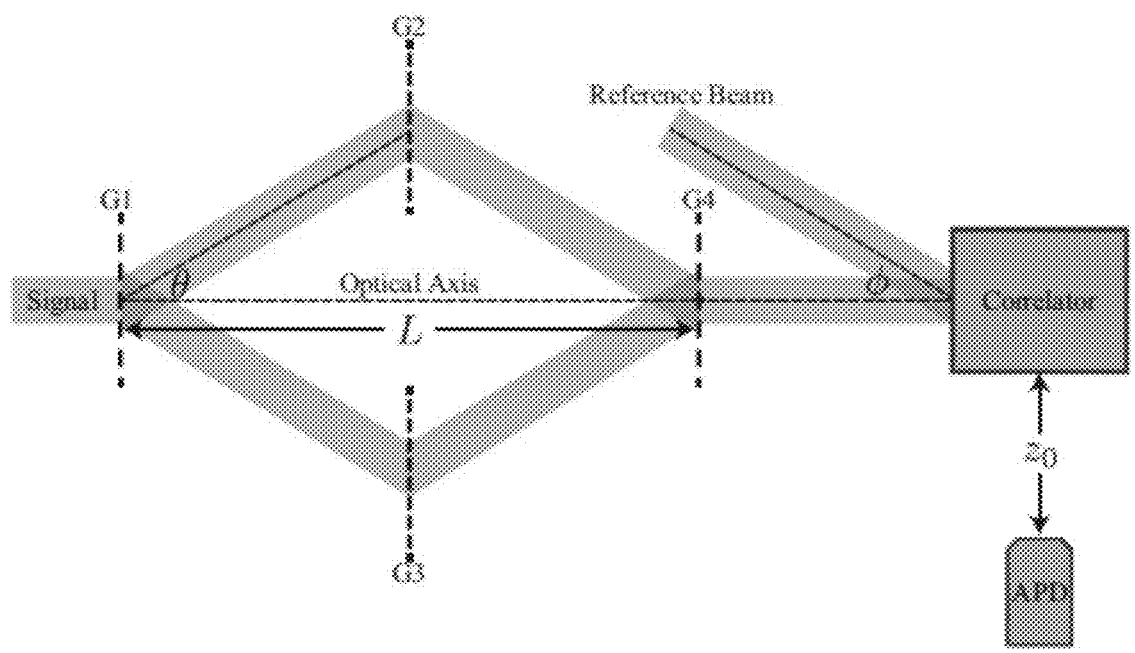
FIG. 8 shows a coherent detection setup in which matched gratings G1: G4 are designed to maximize the ±1 diffraction order, while grating G2 is designed to maximize the −2 order and grating G3 is designed to maximize the +2 order; the reference beam and the signal from the sample are incident on the correlator with an angle of φ between them, and the output signal from the correlator is then incident on a photo-detector, in this case an avalanche photo-diode (APD). The correlator is shown in detail in FIG. 10.

A conceptual sketch of the proposed solution can be seen in FIG. 8. In order to eliminate the second term in (7), a Leith-Upatnieks Hologram is employed, in which a reference that comes at an angle interferes with the signal at the input of the correlator. The incident number of photons on the correlator is given by:

$$N = \alpha \int_t^{t+\tau} \int_A (|E_1|^2 + |E_2|^2 + E_1 E_2^* e^{-i(2\pi \alpha y)} + E_1^* E_2 e^{i(2\pi \alpha y)}) dA dt \quad (8)$$

The two terms $E_1 E_2^* e^{-i(2\pi \alpha y)}$ and $E_1^* E_2 e^{i(2\pi \alpha y)}$ translate to a lateral shift at the detector plane after a free-space propagation. Although the total number of photons incident on the detector plane remains the same, the signal is now separated into three parts (as will be explained in depth later), each at a different physical location on the detector plane. By placing two detectors where the last two terms in (8) are incident, the total number of photons on each detector is $n=\sqrt{n_1 n_2}$, and the background $b_2$ is zero. Using this information, the localization error is now equal to:

$$\langle (\Delta x)^2 \rangle = \frac{s^2}{2\sqrt{n_1 n_2}} \qquad (9)$$

If $n_2 \gg n_1$, the error is significantly lower than the error in the incoherent case.

Figure 11:
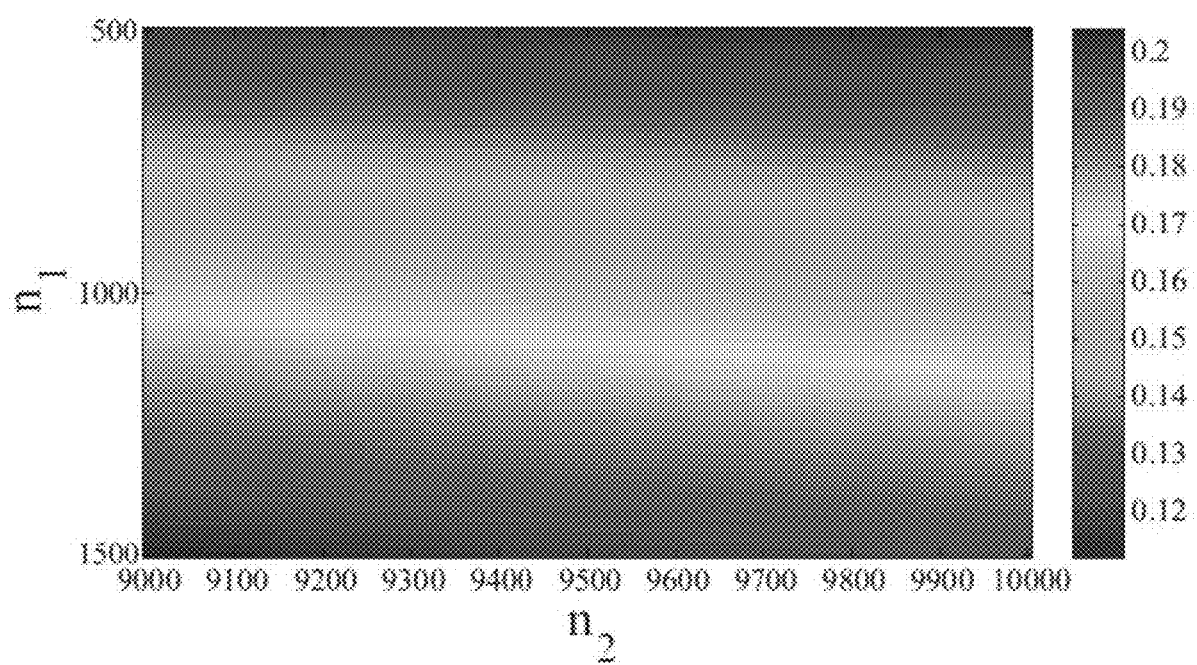
FIG. 11 shows the MSE ratio between coherent and incoherent case when $n_2 \gg n_1$ and the reference beam is incident at an angle.

FIG. 11 shows the ratio in MSE between the coherent case and incoherent case for the proposed scheme. It can be seen that although the signal is eliminated with the background, the mixed fields still contribute to the estimation and the estimation error is lower than in the incoherent case.

Figure 10:
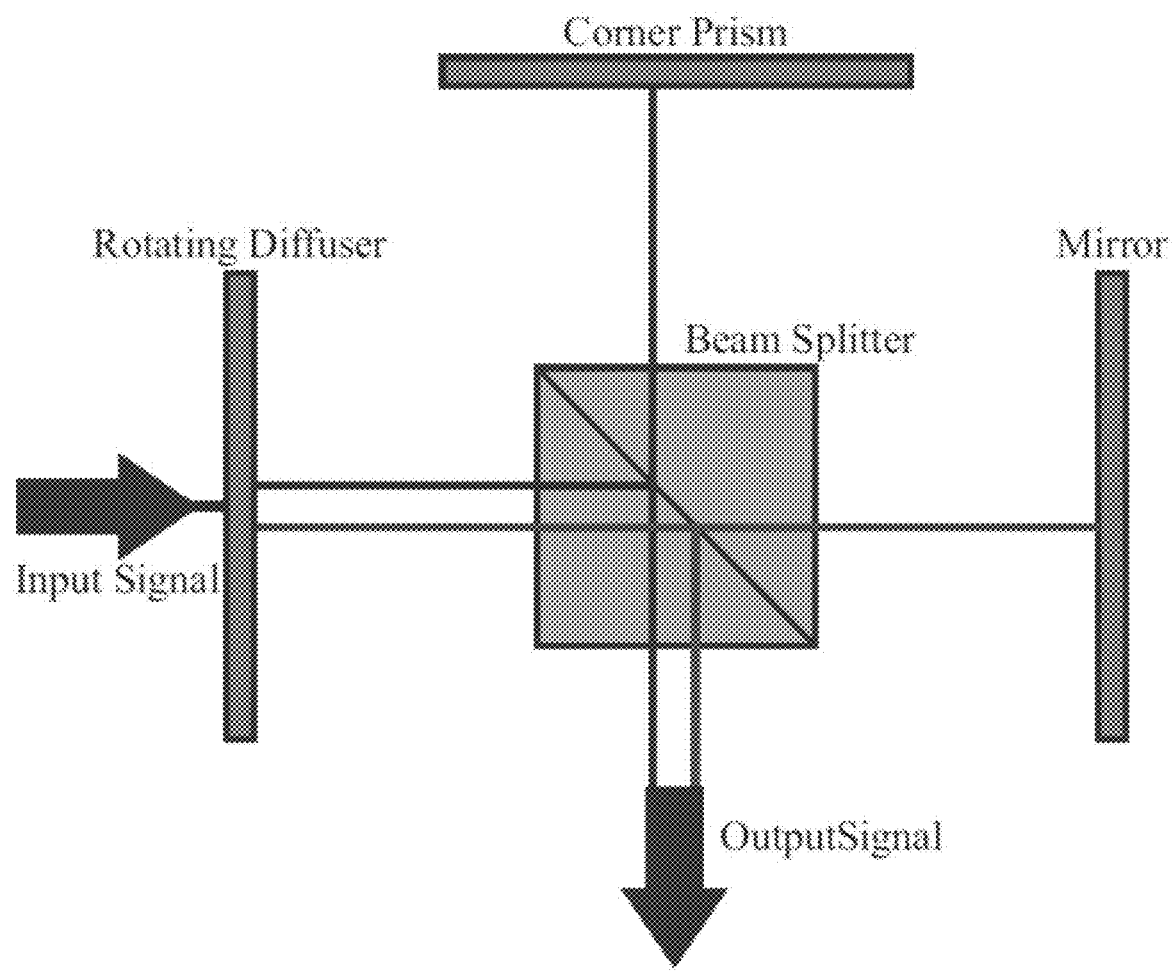
FIG. 10 shows an incoherent cosine transform setup for obtaining the intensity before the detector plane, in which light is incident on a rotating diffuser, is split by a 50/50 beamsplitter, and reflects either off of a mirror or a corner prism, and is then recombined at output from the correlator; the output signal may have three distinct regions: one from $E_1$ and $E_2$, and two from the mixed terms where interference has occurred between the emission and reference signals.

The three terms in (8) ($E_1$ and $E_2$ are considered the same, since they are the same physical location in the detector plane) will only appear if the intensity taken at the detector plane reflects the intensity at the diffuser plane which propagates in free space (otherwise the result will be just the three terms in (8) without the lateral shift). Using the Leith-Upatnieks Hologram to obtain the lateral shift with the optical incoherent cosine transform the intensity at the diffuser plane is obtained. This system can be seen in FIG. 10 and the result is $$I_d = \frac{2E_2}{\lambda^2 z_0^2} \int E_1(x) e^{-i\frac{4\pi}{\lambda z_0}x(\xi+a/2)} dx + \frac{2E_2}{\lambda^2 z_0^2} \int E_1(x) e^{-i\frac{4\pi}{\lambda z_0}x(\xi-a/2)} dx \qquad (10)$$

The two terms in (10) represent the intensity measured on two off-axis detectors after spatial filtering of the unwanted terms.

For each pixel on one of the detectors, the measured intensity is $$I_m(\lambda) = \frac{4E_2}{\lambda^2 z_0^2} \int |E_1(x)|\cos\phi(x)\cos\left(\frac{4\pi}{\lambda z_0} m\Delta\xi\right) dx \qquad (11)$$

where $\phi$ is the phase of the signal electric field, m is the pixel index and $\Delta\xi$ is the pixel size. The dependence of the measured intensity on the phase of the signal allows one to utilize this phase information to improve the resolution. A technique used for temporal high resolution is then used. The incident intensity over a pixel is given by:

$$I_m(\lambda) = A_m \cos\delta_m \cos\left(\frac{4\pi}{\lambda z_0} m\Delta\xi\right) \qquad (12)$$

Dividing the object plane into discrete locations (i.e. $x=n\Delta x$) one can write:

$$I_m(\lambda) = \frac{4E_2}{\lambda^2 z_0^2} \cdot \sum_{n\in\{x_m\}} |E_1(n\Delta x)|\cos\phi(n\Delta x)\cos\left(\frac{4\pi}{\lambda z_0} m\Delta\xi\right) \qquad (13)$$

Note that for each pixel, the sum is over the object plane locations that are within the boundaries of the pixel in the image plane.

If the intensity of two different (adjacent) pixels is measured, equation (12) gives two equations. Since the unknowns in the last equation are $A_m$; $A_{m+1}$; $\delta_m$; $\delta_{m+1}$ additional equations are needed. These equations are provided by the relations of the accumulated amplitude ($A_m$) and phase ($\delta_m$) of adjacent pixels. These relations are demonstrated in FIG. 12: one proceeds by examining $B_n$ and the integration over a pixel. $B_n$ is related to the amplitude of the wave, i.e. the PSF itself. When the center of the PSF is changed within the pixel, different parts of the PSF around the peak are summed within the peak pixel. If the area around the peak is encoded with the proper phase one can expect the same behavior for the phase. The resolution is determined by the phase steps of the encoding, namely $\Delta x$ in (13).

As an example, consider a pixel size of 50 nm and dx=10 nm. There are 5 phase steps, and the case when the phase steps are $\pi/5$, i.e. the phase steps are $\pi k/5$, where k=0 . . . 4, is considered, as demonstrated in FIG. 12.

Figure 12A:
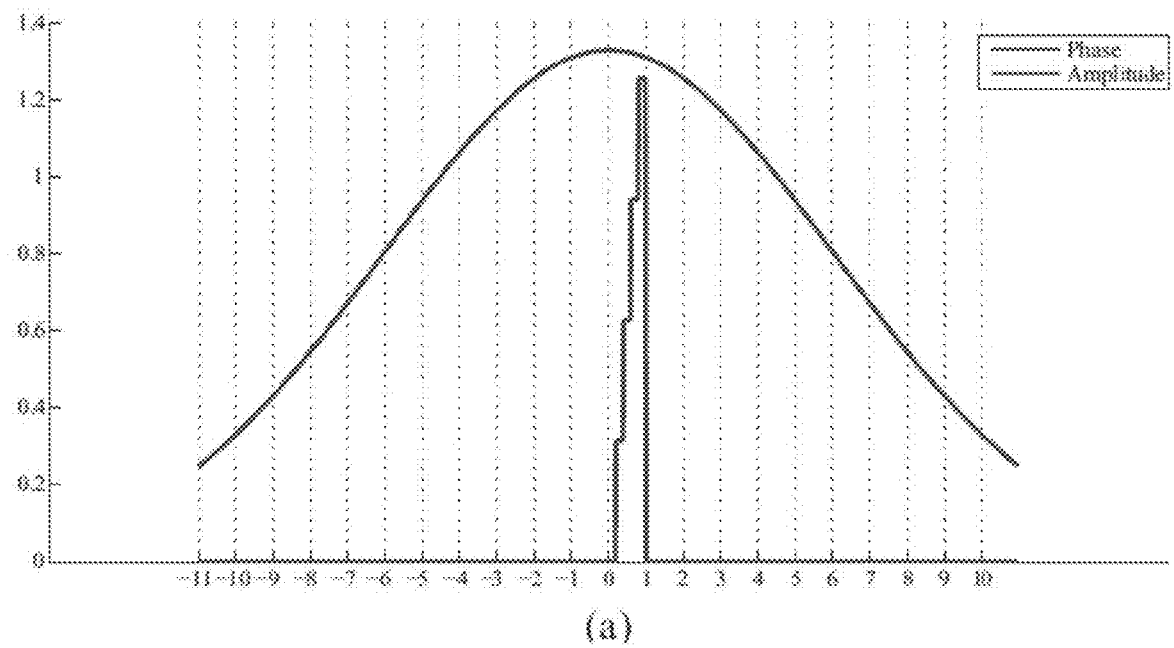
FIGS. 12a-12d show an example of a 5-bit encoding of the phase, where the vertical lines indicate pixel boundaries.
Figure 12B:
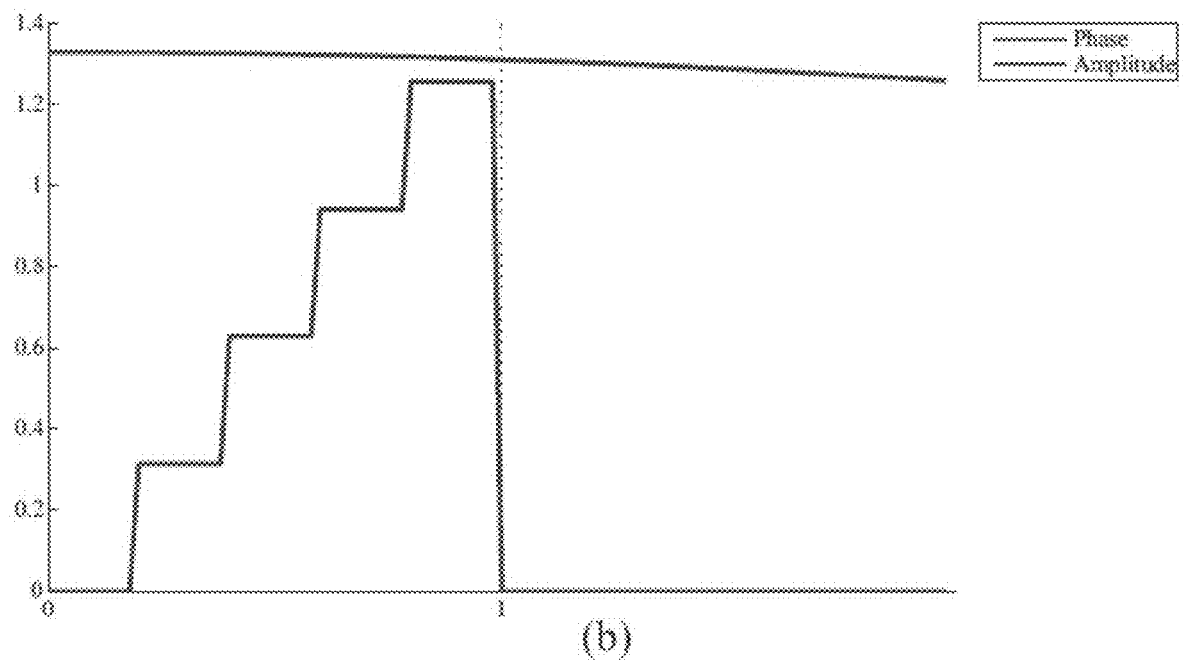
Figure 12C:
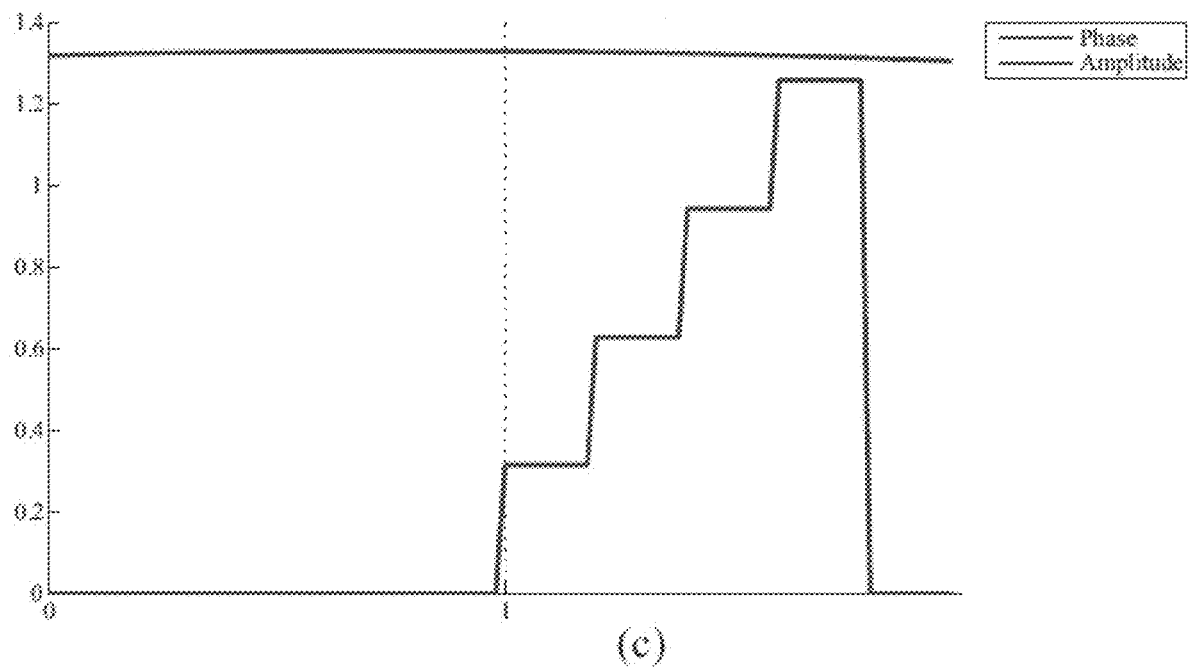
Figure 12D:
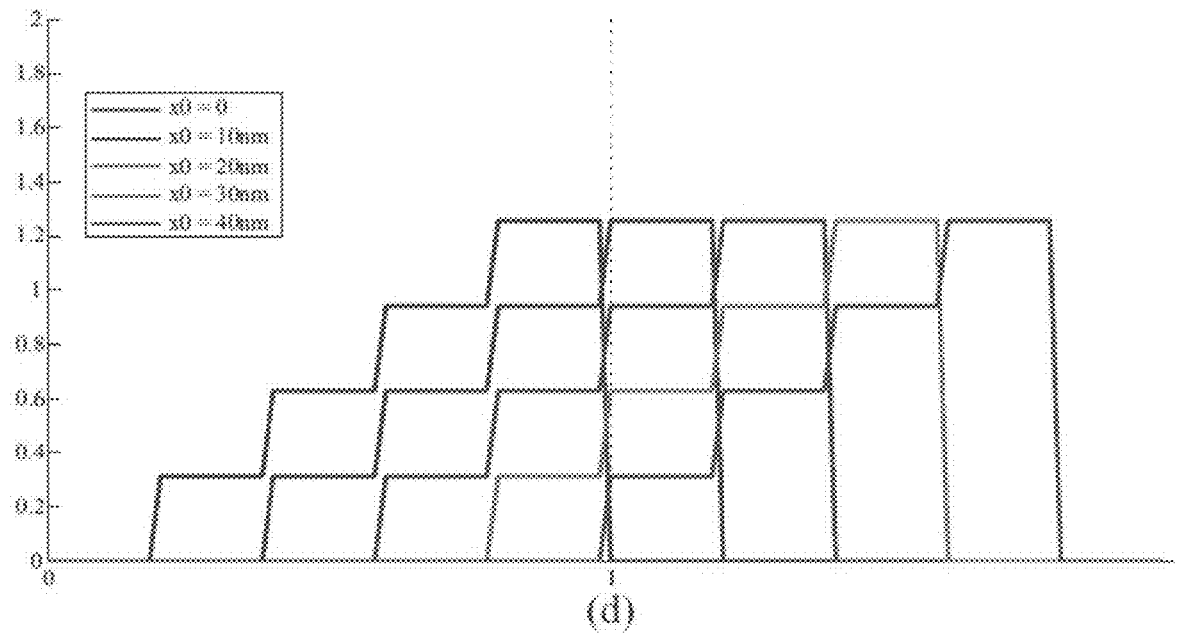

It can be seen in FIG. 12d that for every PSF location different steps in the phase encoding are within the boundaries of the peak pixel. By using the peak pixel and the pixel to its right there are the two equations as in (12). After finding the phase, a pre-computed look-up table can be used in order to find the location of the center of the PSF.

Since the phase steps presented in FIG. 12 are sub-wavelength features, they will not propagate; therefore, a continuous phase may be used in the system. These phase steps are presented for the clarity of the idea. In the case of continuous phase encoding, the resolution cannot be smaller than $\Delta x$ in the look-up table.

Simulation Results

Simulations were performed in order to analyze the performance of the algorithm. For the simulations selected values were a pixel size of 50 nm, standard deviation of the PSF of 300 nm, and simulated shot noise only, assuming low background levels. The PSF was simulated using a Gaussian function with varying peak locations within the same pixel. The peak pixel was assumed to be identified correctly since one can just pick the peak pixel or use a different coarser estimation method in order to find that pixel. The phase used to encode the PSF was a simple linear phase, changing from 0 to $\pi$ over a distance of a wavelength. In these simulation the effect of the increase in the number of detected photons was not taken into account.

Figure 13:
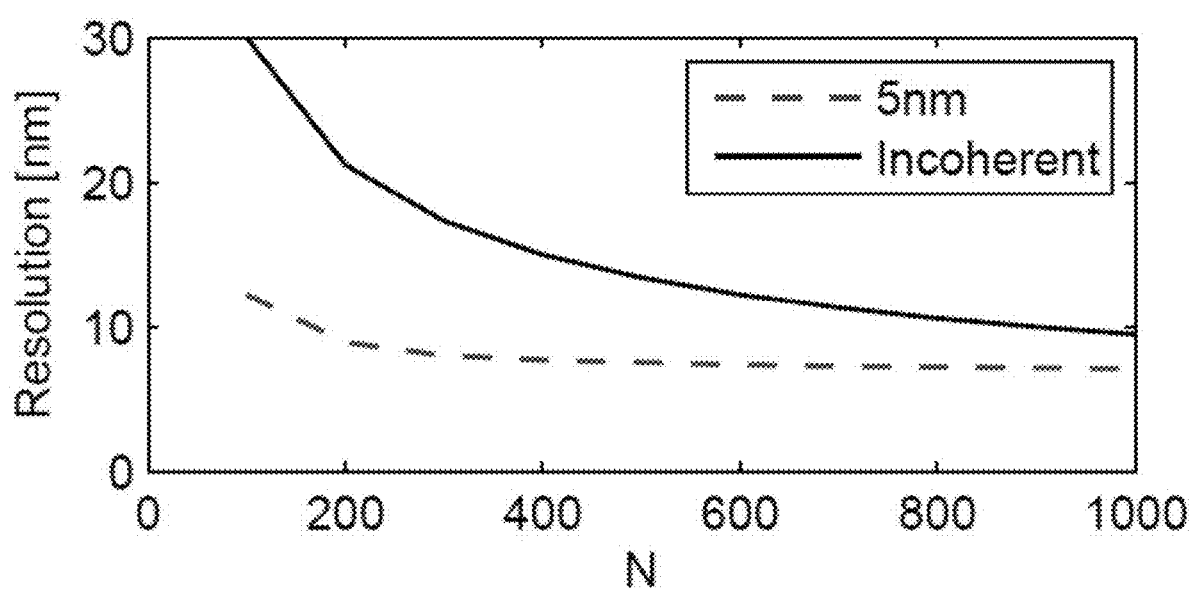
FIG. 13 shows the localization errors as a function of the number of detected photons.

The results for the case of dx=5 nm can be seen in FIG. 13. According to the simulation results, the resolution improvement is higher in the case of small number of detected photons. In this case, a resolution of 8 nm can be obtained for a number of detected photons as low as 200. While these simulations show improvement of 2.5 times in the resolution, better results may be obtained with optimized phase encoding.

One should note that while the simulations implement only a one-dimensional localization problem, the extension to a two-dimensional scenario is straight-forward as the phase can be encoded in such as a way that the two-dimensional plane is encoded into a one-dimensional phase sequence.

The field of optical microscopy has undergone a radical transformation in the past few years, with the advent of various 'super-resolution' techniques that are able to circumvent the diffraction limit of classical optics. For localization-based systems, however, limited photon budgets of the fluorescent markers within the experimental sample constrain the performance of such optical imaging systems. Employing a detection scheme that allows for the use of coherent light allows one to maintain the phase information of the emission signal and use this information to obtain a higher localization of fluorophores than in conventional pointillist-microscopy modalities. The methods disclosed herein demonstrate that a resolution of at least 8 nm is possible with a very low number of detected photons, a result that can be improved further for optimized phase encoding. This localization accuracy is comparable to the resolving capabilities of electron microscopes and is in the same order of magnitude as the size of proteins, thereby providing an optical technique to achieve localization capabilities at the scale of proteins themselves.

Thus, the invention provides, among other things, systems and methods for attaining resolution in light microscopy beyond the diffraction limit. Various features and advantages of the invention are set forth in the following claims.

What is claimed is:

1. A system for enhancing resolution in photoactivated localization (PALM) microscopy, the system comprising:
   a light source for illuminating a sample and generating a fluorescence emission of the sample;
   an objective lens for capturing fluorescence emitted from the illuminated sample to form a signal beam;
   an interference optical element through which the signal beam is directed, wherein the interference optical element includes a plurality of diffraction gratings that separate, redirect, and recombine the signal beam to generate a spatially coherent signal beam that is output from the interference optical element; wherein the interference optical element is configured to shape a point spread function to increase localization precision for detection of the fluorescence emission of the illuminated sample; and
   a reference light source that generates a spatially coherent reference beam having a same spectrum as the fluorescence emission from the illuminated sample, the spatially coherent reference beam interfering with the spatially coherent signal beam prior to incidence on a photodetector to generate an interference signal with an increase in a number of photons for photo detection, wherein the increase in the number of photons in the interference signal increases localization precision in detection of the fluorescence emission of the illuminated sample.

2. The microscopy system of claim 1, further comprising a filter for separating the interference signal into a plurality of laterally-shifted components.

3. The microscopy system of claim 2, further comprising a detector to detect the plurality of laterally-shifted components.

4. The microscopy system of claim 3, wherein the detector comprises an array of pixels onto which the plurality of laterally-shifted components is projected.

5. The microscopy system of claim 3, wherein the detector comprises an analog point detector.

6. The microscopy system of claim 5, further comprising a scanning mechanism to scan the light source across the sample.

7. The microscopy system of claim 2, wherein the filter comprises a correlator, and wherein the correlator comprises a rotating diffuser, a beamsplitter, a corner prism, and a mirror.

8. The microscopy system of claim 1, wherein the plurality of diffraction gratings include two pairs of identical binary-phase diffraction gratings for the separation of, redirection of, and recombination of the signal beam to generate the spatially coherent signal beam.

9. A method for enhancing resolution in photoactivated localization (PALM) microscopy, the method comprising:
   illuminating a sample with a light source for generating a fluorescence emission of the sample;
   capturing fluorescence emitted from the sample with an objective lens to form a signal beam;
   directing the signal beam through an interference optical element that includes a plurality of diffraction gratings;
   splitting, redirecting, and recombining the signal beam by the plurality of diffraction gratings to generate a spatially coherent signal beam;
   outputting the spatially coherent signal beam by the interference optical element;
   wherein the interference optical element is configured to shape a point spread function of the spatially coherent signal beam to increase localization precision for detection of the fluorescence emission of the illuminated sample; and
   generating a spatially coherent reference beam from a reference light source, the spatially coherent reference beam having a same spectrum as the fluorescence emission from the illuminated sample, the spatially coherent reference beam interfering with the spatially coherent signal beam prior to incidence on a photodetector to generate an interference signal with an increase in a number of photons for photo detection, wherein the increase in the number of photons in the interference signal increases localization precision in detection of the fluorescence emission of the illuminated sample.

10. The method of claim 9, further comprising separating the interference signal into a plurality of laterally-shifted components using a filter.

11. The method of claim 10, wherein the filter comprises a correlator, and wherein the correlator comprises a rotating diffuser, a beamsplitter, a corner prism, and a mirror.

12. The method of claim 11, further comprising projecting the plurality of laterally-shifted components onto a detector.

13. The method of claim 12, wherein the detector comprises an array of pixels onto which the plurality of laterally-shifted components is projected.

14. The method of claim 13, further comprising determining a point-spread function (PSF).

15. The method of claim 14, further comprising encoding the PSF with a phase.

16. The method of claim 15, wherein encoding the PSF with a phase comprises estimating the phase using an amplitude of the PSF.

17. The method of claim 12, wherein the detector comprises a point detector.

18. The method of claim 17, further comprising scanning the light source across the sample using a scanning mechanism.

19. The method of claim 17, further comprising collecting a filter signal with the point detector, transforming the filter signal to the frequency domain, and removing a zero-frequency component from the transformed filter signal.

20. The method of claim 19, wherein the point detector is selected from a photocathode and an avalanche photodiode.

21. The method of claim 9, wherein the plurality of diffraction gratings comprise two pairs of identical binary-phase diffraction gratings, the method further comprising the splitting, the redirecting, and the recombining of the signal beam using the two pairs of identical binary-phase diffraction gratings for the generation of the spatially coherent signal beam.

* * * * *